Patented Oct. 20, 1953

2,656,295

UNITED STATES PATENT OFFICE 2,656,295

METHOD FOR IMPROVING THE FLAME RESISTANCE OF METAL AND PRODUCT

Walter Frederick Locke, Emsworth, England, assignor to Fireproof Tanks Limited, London, England, a British company No Drawing. Application December 13, 1950, Serial No. 200,699. In Great Britain December 30, 1949

6 Claims. (Cl. 154—128)

The invention relates to heat-resisting and heat-insulating materials of the kind which may be used for structural or other purposes in the manufacture of panels, partitions or containers in which heat-resisting properties are required such for example as in aircraft or on vehicles or vessels.

In accordance with the invention the material comprises a laminated structure in which at least one lamina is composed of a glass or quartz fabric and the laminae are bonded together by a flexible synthetic resinous composition including a polymer which does not itself support combustion. The material may include a plurality of laminae of glass fabric and may also include one or more laminae of material which when used alone has lower heat-resisting properties.

An important application of the invention is the production of flame-proof parts in aircraft and like structures in which a flame-proof covering of one or more laminae of glass and/or quartz fabric is applied to a backing layer of a low melting point metal or alloy such as aluminium, magnesium or alloys thereof. In this case the backing layer constitutes one of the laminae of the fireproof material according to the invention. In certain of the applications of the invention however, no backing layer need be present and in this case the material in accordance with the invention will comprise two or more laminae of glass fabric bonded together with a synthetic resinous composition as hereinbefore specified. It is also possible to include in the material according to the invention a backing layer or intermediate reinforcing lamina comprising a metallic foil flat or suitably corrugated and/or a perforated or open work metal sheeting or mesh.

The glass fabric utilised according to the invention is preferably one woven from a high melting point glass of melting point above 900° C. Suitable polymers for bonding properties are polyvinyl chloride and copolymers including polyvinyl chloride such as copolymerised vinyl chloride and acetate, similar polyvinylidine halides and halide copolymers and polymers containing halogenated hydrocarbons such as polyfluorochloroethylene. These polymers may be compounded with plasticizers which are non-supporters of combustion e. g. tricresyl phosphate and non-combustible fillers such as titanium dioxide, earth colours etc.

The invention is illustrated by the following examples:

Examples

1. A flame-proof product was produced from 18 S. W. G. Duralumin sheet by first painting it with a primer having the following composition:

| | |
|---|---|
| Vinyl acetate-chloride copolymer resin | 15 |
| Tricresyl phosphate | 4 |
| Titanium dioxide | 5 |
| Solvents | 85 |
| Lead carbonate | 0.3 |

Upon the primed surface, two layers of fine high-melting point glass fabric were applied each being coated and impregnated with the primer composition before application of the next layer and the final surface being coated and impregnated so that the laminated structure comprises three laminae bonded together by the synthetic resin. The sheet so produced resisted a blow lamp flame at approximately 1,000° C. applied to the protected side for 15 minutes. Although the alloy layer was softened no penetration by flame took place. An identical sheet of Duralumin not treated in accordance with the invention was melted by the same flame within a period of between 1 and 2 minutes.

2. For the lacquer in Example 1 used both as a primer and for paint for the laminae a lacquer of the following composition was substituted:

| | |
|---|---|
| Vinyl acetate-chloride coplymer resin | 25 |
| Tricresyl phosphate | 12 |
| Titanium dioxide | 20 |
| Solvents | 75 |
| Lead carbonate | 2 |

The sheet so produced also withstood 15 minutes' fire test on the protected side with a blow lamp flame at 1,000° C.

The material produced in accordance with the invention either of the preceding examples is suitable for use as a fireproof bulkhead for aircraft or similar use. By using a composite material having a backing of 18 S. W. G. Duralumin sheeting with 3 laminae of glass cloth having a yielding strength above 200 lbs. per 1 in. width the resistance of the material to shock is such that it may be used in the construction of crashproof and fireproof oil and fuel tanks for air, land and seacraft.

The superficial glass laminae or lamina of the material in accordance with the invention may be rendered highly reflective by coating with metal powder or by painting with a metal pigmented non-inflammable lacquer.

I claim:

1. A method for improving the flame resistance of sheet material formed of a light metallic substance selected from the group consisting of aluminum and magnesium base metals, which comprises covering one face of the sheet material with at least one layer of woven fabric from the group consisting of glass and quartz fabric, impregnated with a vinyl halide, vinyl acetate copolymer resin.

2. A method as claimed in claim 1 in which the fabric is glass, and tricresyl phosphate is included in the resin as a plasticizer.

3. A method as claimed in claim 2 in which titanium dioxide is included with the resin as a filler.

4. A fireproof light-weight sheet material comprising an aluminum base metal sheet coated with a fabric of woven glass fibres impregnated with a vinyl halide, vinyl acetate copolymer.

5. A fireproof light-weight sheet material comprising Duralumin sheet coated with a fabric of woven glass fibres impregnated with a vinyl halide, vinyl acetate copolymer.

6. A fireproof light-weight sheet material comprising a sheet of magnesium base metal coated with a fabric of woven glass fibres impregnated with a vinyl halide, vinyl acetate copolymer.

WALTER FREDERICK LOCKE.

References Cited in the file of this patent

UNITED STATES PATENTS

| Number | Name | Date |
|---|---|---|
| 2,219,054 | Palm et al. | Oct. 22, 1940 |
| 2,275,957 | Groff | Mar. 10, 1942 |
| 2,475,517 | Ries et al. | July 5, 1949 |
| 2,528,235 | Loritsch | Oct. 31, 1950 |